Oct. 18, 1966  P. H. DIXON  3,279,045
ASSEMBLING MECHANISM
Filed Aug. 3, 1964  9 Sheets-Sheet 2

INVENTOR
Paul H. Dixon
by Wolfe, Hubbard, Voit, Osann
ATTORNEY

Oct. 18, 1966   P. H. DIXON   3,279,045
ASSEMBLING MECHANISM
Filed Aug. 3, 1964   9 Sheets-Sheet 3

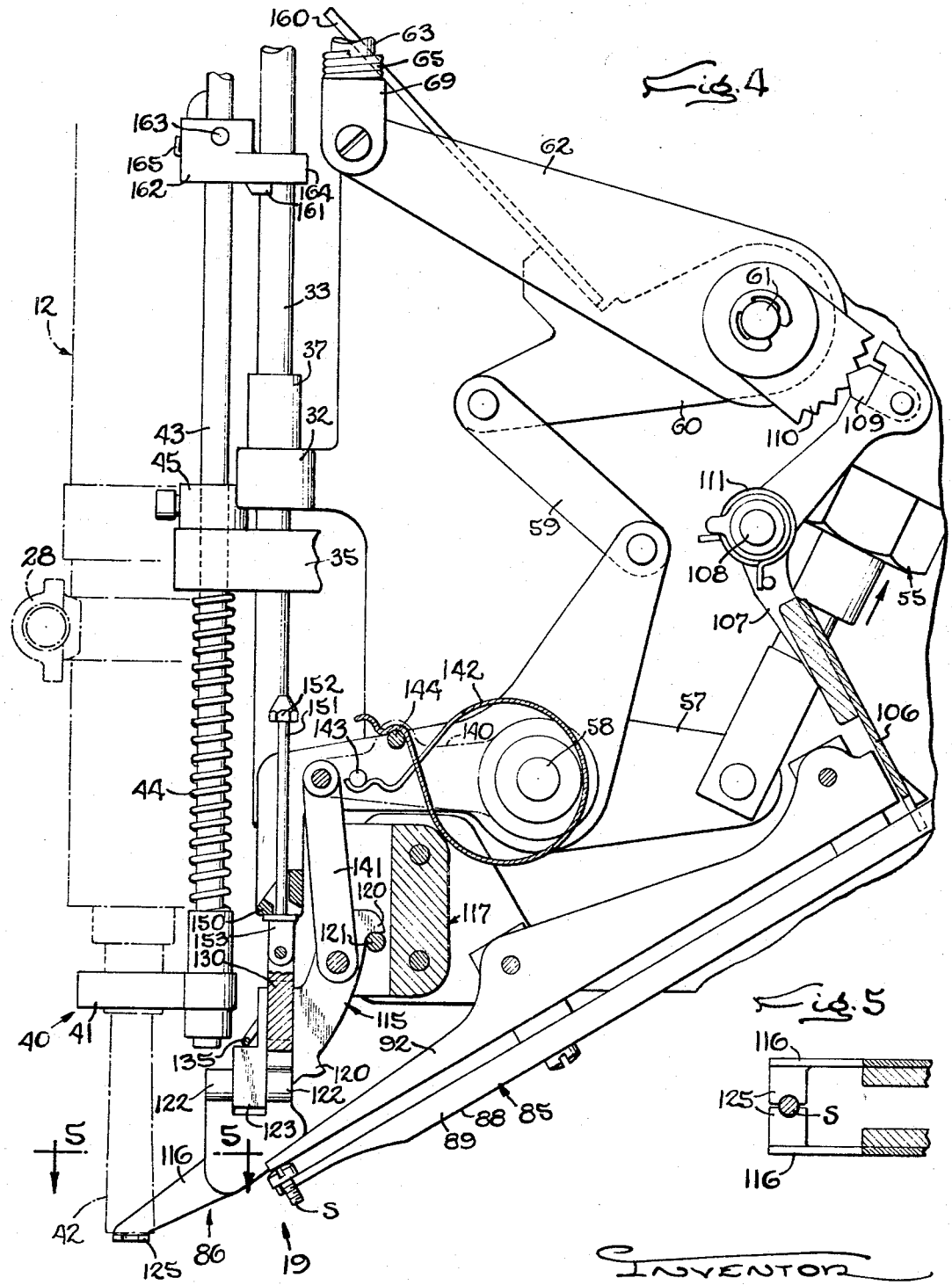

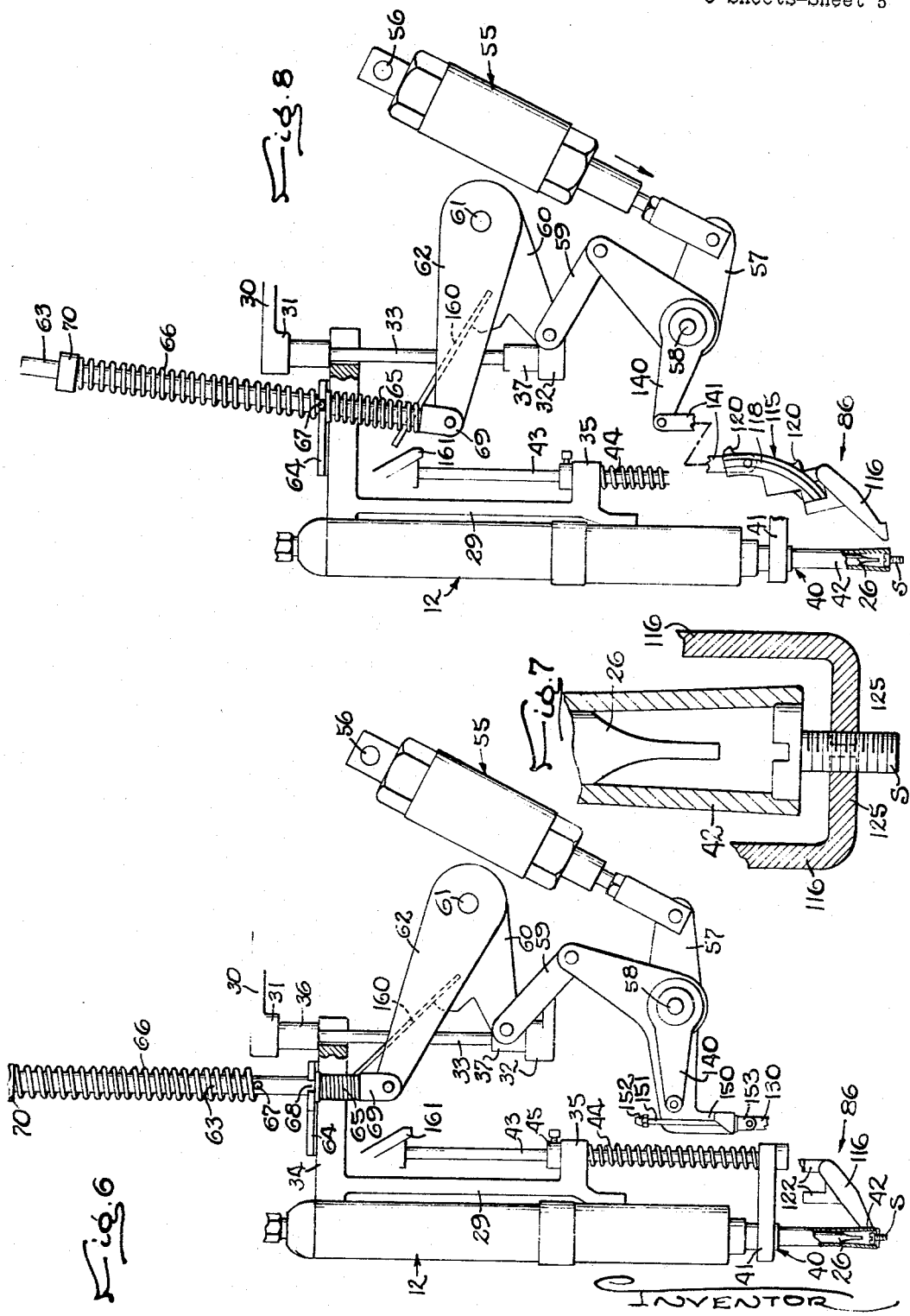

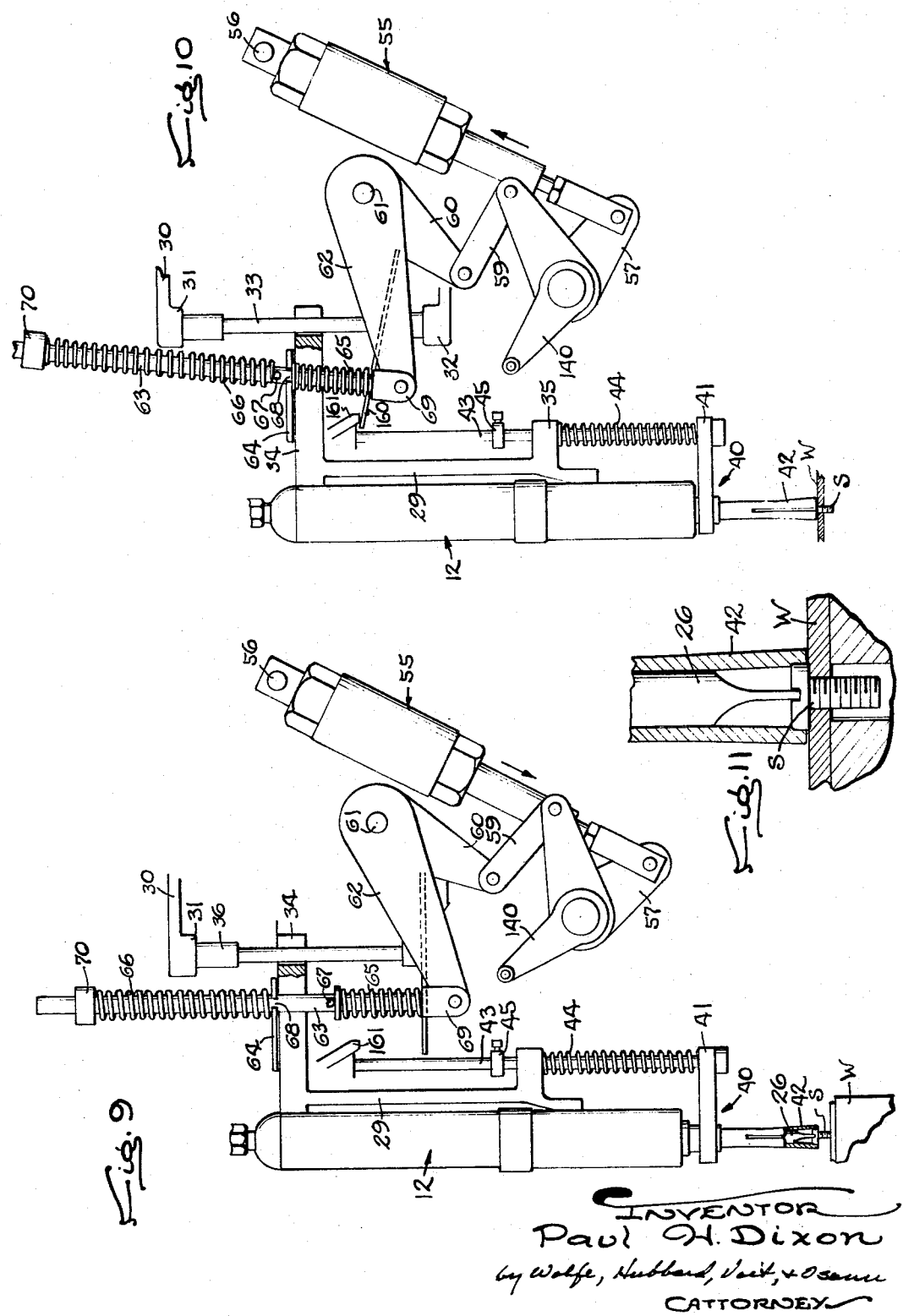

Oct. 18, 1966 P. H. DIXON 3,279,045
ASSEMBLING MECHANISM
Filed Aug. 3, 1964 9 Sheets-Sheet 7
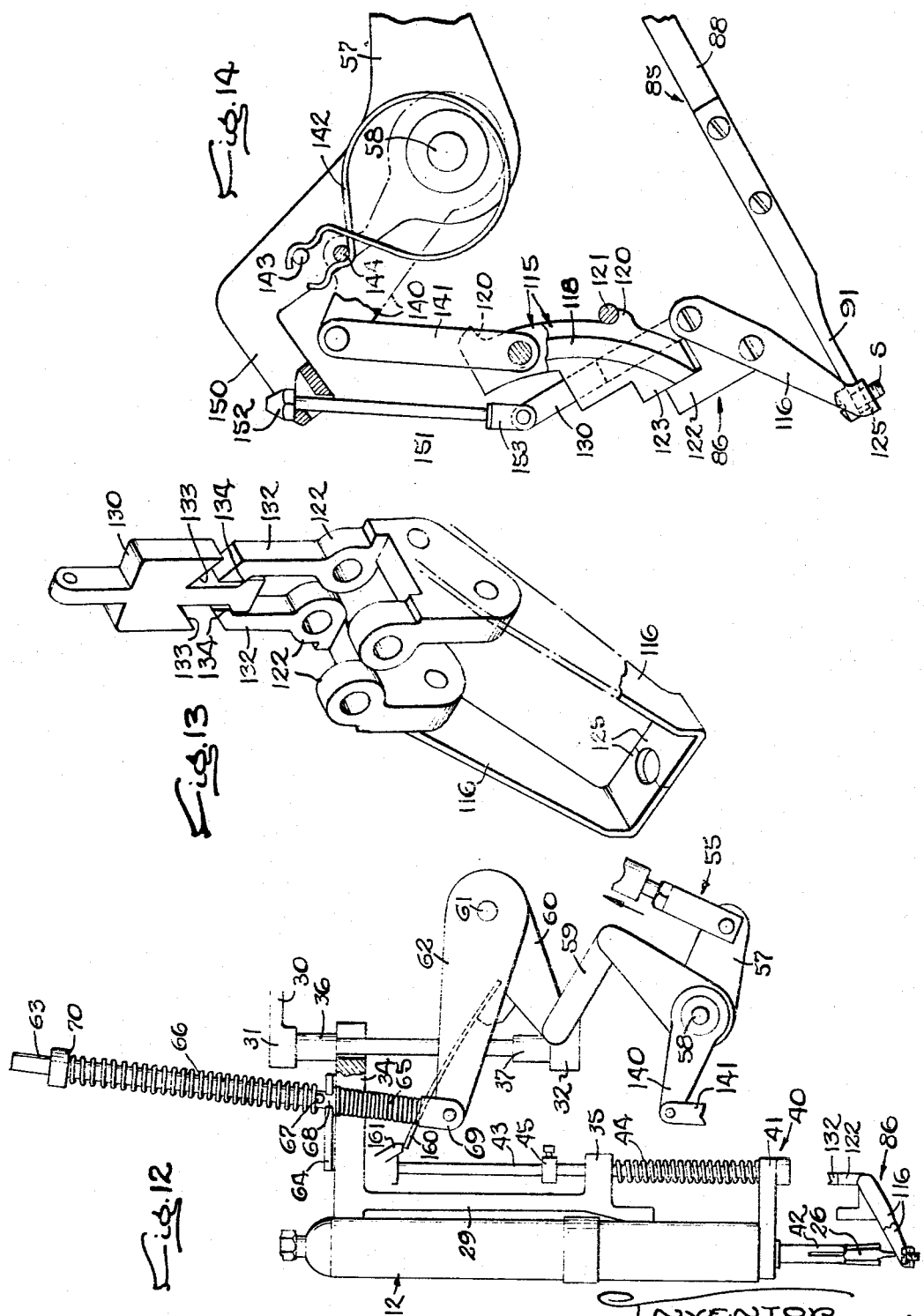

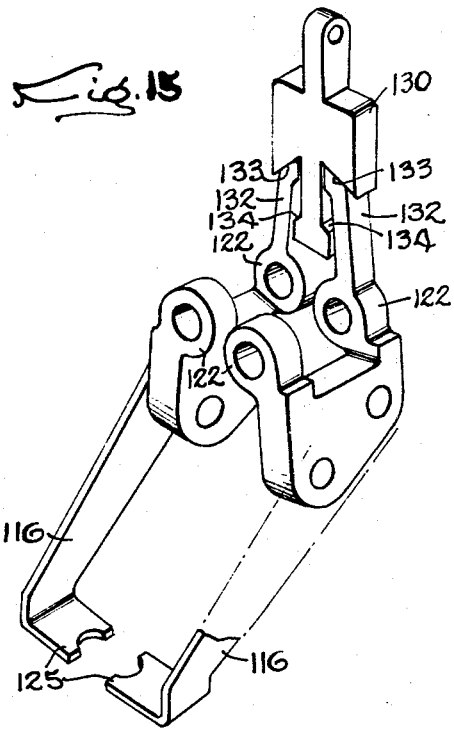
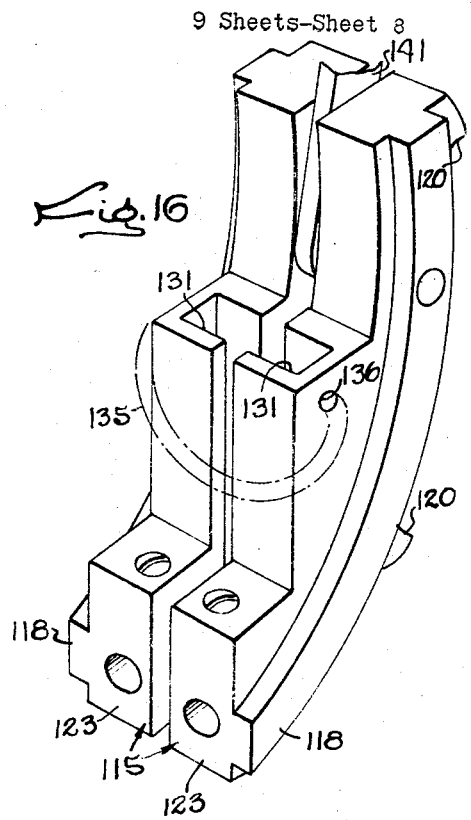
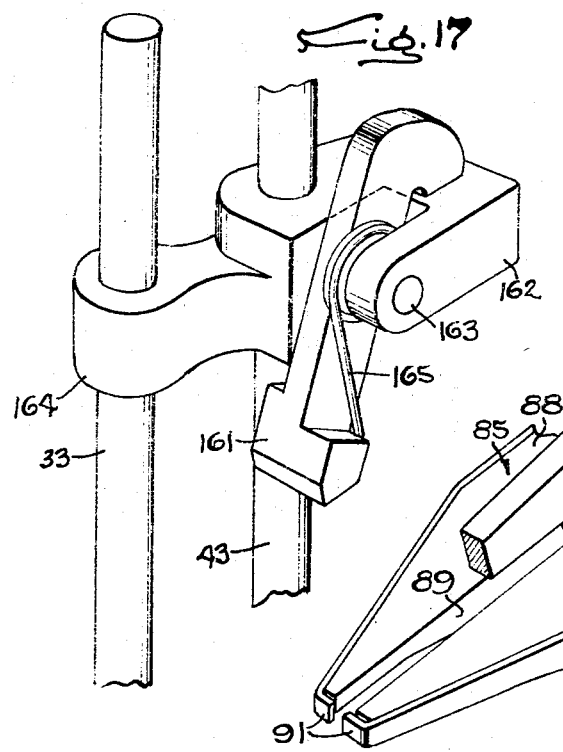
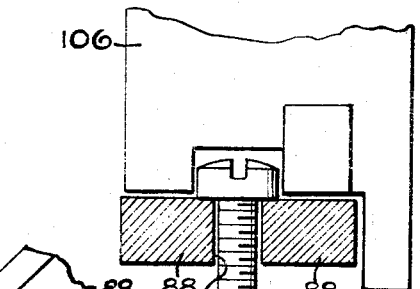

Oct. 18, 1966
P. H. DIXON
3,279,045
ASSEMBLING MECHANISM
Filed Aug. 3, 1964
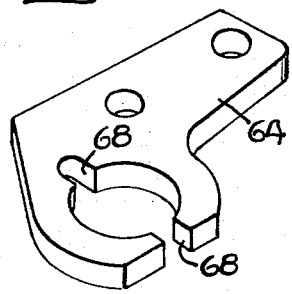
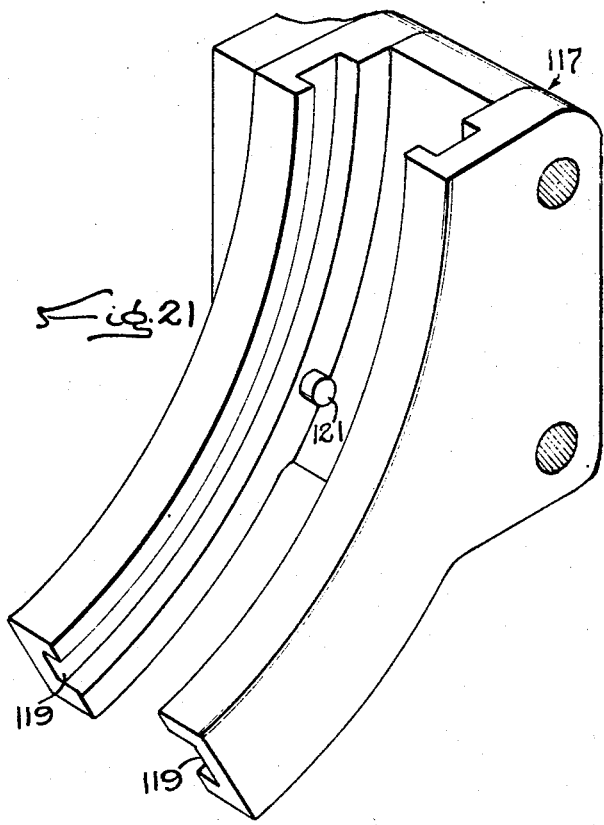
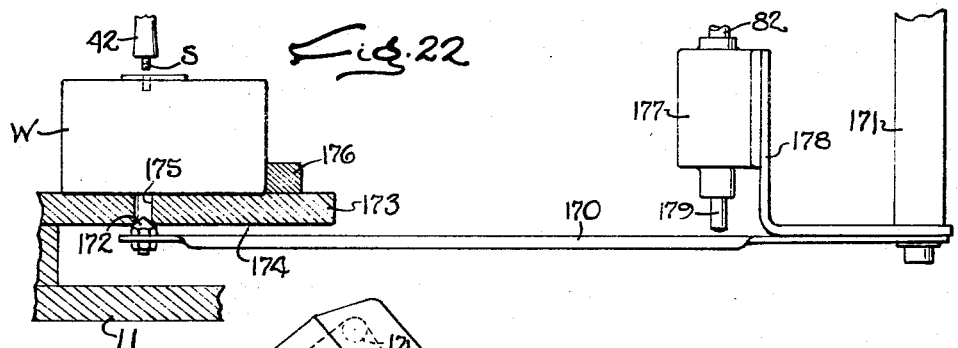
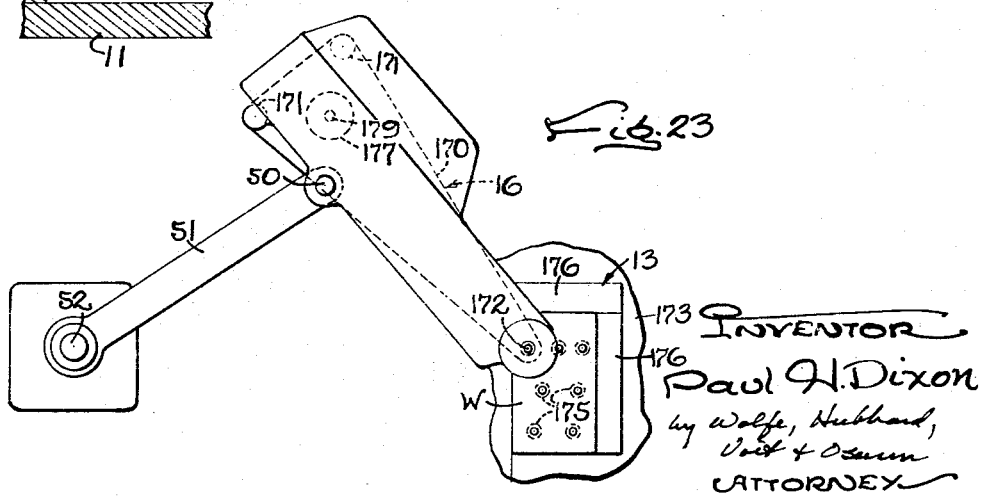

United States Patent Office 3,279,045
Patented Oct. 18, 1966

3,279,045
ASSEMBLING MECHANISM
Paul H. Dixon, 4122 Crosby St., Rockford, Ill.
Filed Aug. 3, 1964, Ser. No. 387,246
21 Claims. (Cl. 29—211)

This invention relates generally to power operated assembling machines and more particularly concerns a mechanism for carrying, feeding and positioning a tool such as a power operated screwdriver.

It is the primary aim of the invention to provide a mechanism which utilizes a conventional tool such as a power operated screwdriver to form a high speed, production machine having power actuation, automatic part feed, and semi-automatic tool positioning. A related object is to provide a mechanism as characterized above that readily mounts alternate tools and adapts without modification to workpieces of differing height.

In more detail, it is an object of the invention to provide a mechanism of the above character which is compact, easy to operate and capable of heavy duty, trouble free operation. A connected object is to provide a mechanism of this kind that is economical to manufacture and operate, particularly in that a single actuator is utilized which positively synchronizes the functions of the mechanism.

In one aspect of the invention, it is an object to provide a novel finder device for semi-automatic tool positioning that helps the operator quickly locate a desired work point and positively centers the tool at that point. A collateral object is to provide a finder of the above kind that cooperates well with other powered automatic tool handling mechanisms and is also adapted for facilitating the use of manually handled tools.

An object of another aspect of the invention is to provide an improved, high speed part feeding mechanism that functions reliably and accurately. A related object is to provide a mechanism of this character that is well suited for adaption to handle with facility parts of different sizes and configurations.

Other objects and advantages of the invention will become apparent upon reading the following detailed description and upon reference to the drawings, in which:

FIG. 4 is a fragmentary section taken approximately along the line 4—4 in FIG. 3;

FIG. 5 is a fragmentary perspective taken along the line 5—5 in FIG. 4;

FIG. 6 is a partially diagrammatic elevation with the parts of the mechanism shown in one operating position;

FIG. 7 is a slightly enlarged fragmentary elevation of the lower end of the structure shown in FIG. 6;

FIGS. 8, 9 and 10 are similar to FIG. 6 and show the parts in alternate operating positions;

FIG. 11 is similar to FIG. 7 and shows the corresponding structure when in the FIG. 10 position;

FIG. 12 is similar to FIG. 6 and shows another operating position of the parts;

FIG. 13 is a fragmentary perspective of parts included in the transfer mechanism or feeder;

FIG. 14 is a fragmentary elevation of one position of operation assumed by the feeder;

FIG. 15 is a perspective similar to FIG. 13 showing the parts in an alternate operating position;

FIG. 16 is a fragmentary perspective of another portion of the feeder;

FIG. 17 is an enlarged fragmentary perspective of a portion of the structure otherwise appearing at the top of FIG. 4;

FIG. 18 is a fragmentary section of a portion of the conveyor otherwise shown at the right of FIG. 4;

FIG. 19 is a fragmentary perspective of the lower end of the conveyor otherwise appearing in FIG. 4;

FIG. 20 is a perspective of a part otherwise appearing at the top of FIGS. 1 and 2;

FIG. 21 is a perspective of another portion of the feeder;

FIG. 22 is a fragmentary elevation corresponding to the lower portion of FIG. 2 showing the parts in an alternate operating position; and FIG. 23 is a partially diagrammatic plan, in reduced scale, of the mechanism shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
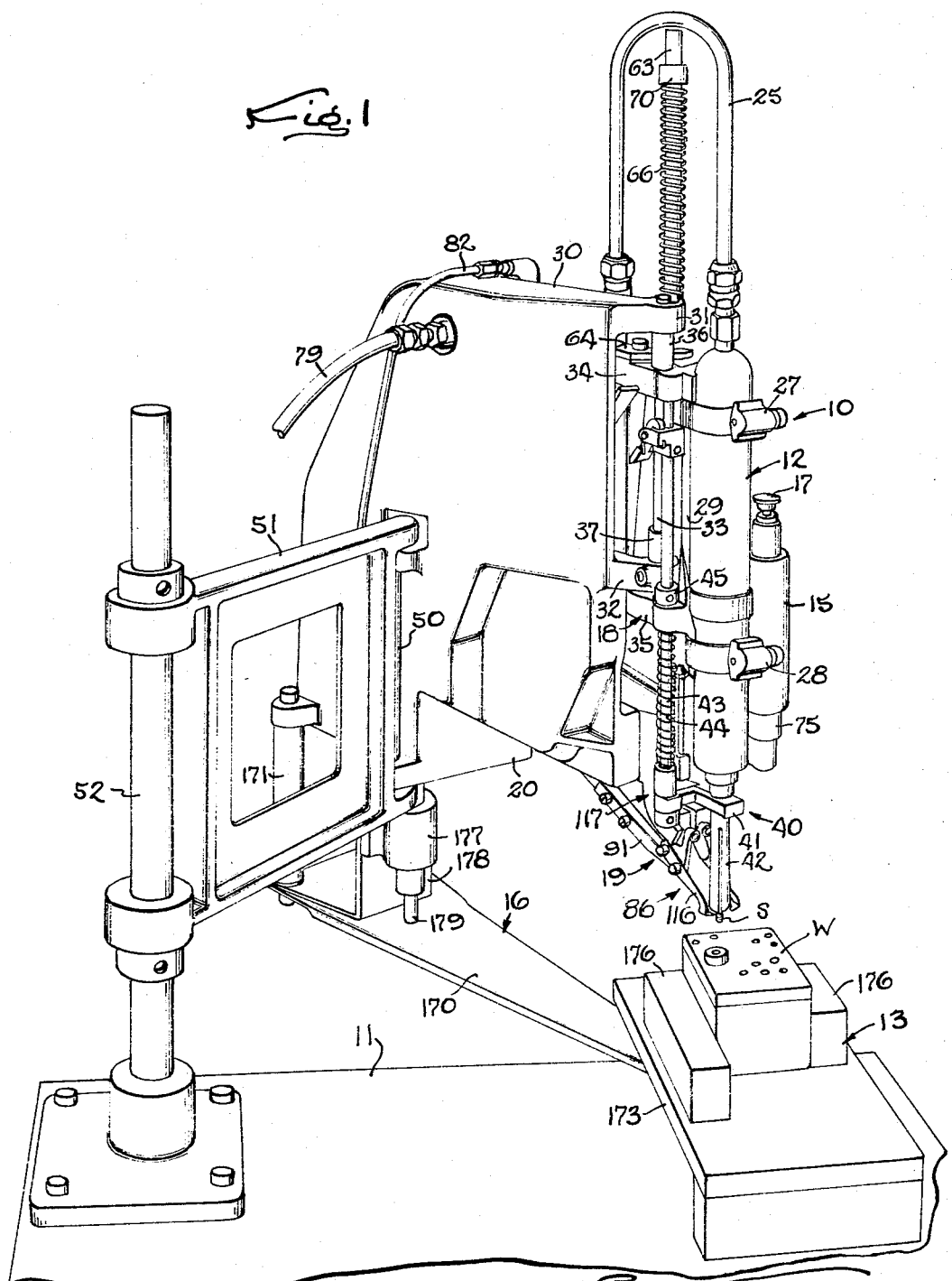
FIGURE 1 is a perspective of an assembling mechanism embodying the present invention.

Turning first to FIG. 1, there is shown an assembling mechanism embodying the invention and mounted on a table or work surface 11 so as to operate on a workpiece W. In the exemplary construction, the mechanism mounts a power driven screwdriver 12 and is adapted to drive screws S (see also FIG. 7) into the top of the workpiece W while the latter is held stationary in a jig or fixture 13.

With a workpiece W in place, the operator of the mechanism 10 grasps a handle 15 at one side of the driver 12, swings the driver over the workpiece until the screw S is approximately over the hole which is to receive it in which position the finder-positioner device 16 indicates the driver is properly poised, and then pushes a thumb button 17. As a result, the driver, pneumatically driven in the exemplary construction, is rotatably actuated, lowered by a carrier mechanism 18 with a screw S frictionally held at its working head, and the screw is driven into the workpiece. Proper alinement between the driver 12 and the workpiece W is established by the device 16. At the same time, a part feeding apparatus 19 picks up another screw from a hopper 20 (see FIG. 2).

Upon release of the button 17, the driver 12 is elevated by the carrier mechanism 18, the apparatus 19 places another screw in the frictional grip of the driver, and the device 16 frees the mechanism for seeking and threading a screw into the next hole. Because of the compact, positive actuation of the various parts, and the interaction between the driver carrier mechanism and the part feeding apparatus, the machine cycles quite rapidly and is capable of driving short screws of the kind illustrated in a one to two second cycle.

While the preferred mechanism mounts a screwdriver and handles ordinary slot head screws, it will be apparent to those skilled in the art that other tools can be mounted in lieu of the driver 12, such as a power wrench, and other kinds of parts may be handled whether intended for threading or another assembly expedient.

Driver carrier mechanism

The screwdriver 12 is preferably a standard tool supplied with air under pressure through a line 25 and having a screwdriving blade 26 in its working head (see FIG. 6). The driver 12 is rigidly and releasably secured by a pair of clamps 27 and 28 in an arcuate cradle formed in a bracket 29 that is slidably mounted on a carrier 30 for reciprocating movement toward and away from the workpiece W. In the preferred construction, the carrier 30 includes lugs 31 and 32 that solidly mount a vertical rod 33. The bracket 29 is formed with upper and lower lugs 34 and 35, respectively, that are slidably fitted on the rod 33. Spacer sleeves 36 and 37 at the top and bottom of the rod 33 engage the bracket lug 34 and limit up and down sliding movement of the bracket. The bracket 29 is held alined on the rod 33 by an integral arm 38 having a slotted end fitted on opposite sides of a plate 39 fixed in spaced relation on the body of the carrier 30 (see FIG. 2).

To frictionally hold the screw parts S at the working head of the driver 12, the driver is fitted with a chuck or holder 40 which includes a collar 41 slidably fitted on the lower end of the driver that carries a slotted sleeve defining resilient fingers 42 extending around the driver blade 26. The fingers 42 frictionally grip the screw parts S by being resiliently spread about the head of the screw, as suggested in FIGS 7 and 11. For normally positioning the holder 40 in its lowered active position, a rod 43 is secured to the collar 41 and extended slidably up through the bracket lugs 35 and 34. A helical compression spring 44 surrounds the rod 43 between the lug 35 and the collar 41 so as to normally urge the rod and collar downwardly to a position established by a stop collar 45 which is fixed to the rod 43 and abuts the upper surface of the bracket lug 35. Raising the rod 43 moves the holder 41 out of its active position by retracting the fingers 42 about the driver blade 26.

The carrier 30 is preferably an open-sided, box-like housing providing both a rigid mounting frame and a portion of an enclosure for the mechanism 10. The carrier 30 is mounted for horizontal movement in a plane spaced from the workpiece fixture 13. In the illustrated construction, the carrier is pivoted on a shaft 50 at the top and bottom of an arm 51 of substantial height (see FIG. 1) that, in turn, is pivoted on a vertical post 52 rigidly fixed on the work surface 11 so as to form a frame for the mechanism 10. The arm 51 swings freely on the post 52, and the carrier 30 swings freely on the arm 51, so that the driver 12 may be readily positioned above the workpiece W by grasping the handle 15 and swinging the mechanism on its articulated frame.

In carrying out the invention, the bracket 29 is vertically reciprocated by an operator common to other parts of the machine through a linkage embodying a lost motion mechanism. Preferably, the operator is a two-way pneumatic actuator 55 anchored at 56 on the carrier 30 and connected to rotate a bell crank 57 pivoted on a shaft 58 that is mounted on the carrier 30. The bell crank 57 is connected by a link 59 to a second bell crank 60 pivoted on a shaft 61 secured to the carrier 30. The second bell crank 60 is formed with a long arm 62 that pivotally carries the lower end of an actuating rod 63 that slidably extends through an apertured plate 64 (see also FIG. 20) rigidly secured to the top of the bracket 29. Raising and lowering springs 65 and 66, respectively, surround the bottom and top portions of the actuating rod 63 so that up and down motion of the rod 63 is imparted to the bracket 29 through the springs 65, 66 and the plate 64. The spring 65 seats against a yoke 69 securing the rod 63 to the arm 62, and the spring 66 seats against a collar 70 fixed to the rod 63. To prevent interaction between the springs 65, 66, their adjacent ends are intended to abut a pin 67 fixed through the rod 63. The pin 67 is disposed to pass freely through slots 68 formed in the bracket plate 64.

It can thus be seen that retracting the actuator 55 toward its rest position, the direction of movement shown by the arrow in FIG. 4, rotates the crank 57 counterclockwise so that the crank 60 is turned, through the link 59, in a clockwise direction that is effective to lift the actuating rod 63. Engagement of the spring 65 with the underside of the bracket plate 64 thus slides the bracket upwardly until the bracket lug 34 strikes the spacer 36. When this stop position is reached, the raising spring 65 is compressed and lost motion is taken up. Conversely, extending the actuator 55 to its work position, the direction of movement shown by the arrow in FIG. 9, rotates the bell crank 57 in a clockwise direction which pulls, through the link 59, the second bell crank 60 counterclockwise so as to draw the actuating rod 63 downwardly. Initial movement of the rod 63 simply relaxes the raising spring 65 and the force of this compressed spring holds the bracket 29 up against the sleeve 36. As the pin 67 slips through the slots 68 in the bracket plate 64, the lowering spring 66 engages the upper surface of the plate 64 so as to urge the bracket 29, and the driver 12 which it carries, downwardly. When the screw held in the working head of the driver engages the workpiece W, the holder 40 stops its downward movement and further downward movement of the bracket 29 lowers the driver blade 26 (FIG. 9) and further downward movement of the actuating rod 63 by extension of the actuator 55 causes compression of the lowering spring 66, thus taking up the lost motion in the linkage and continues pressure on the screw to drive it. The lowering spring 66 is substantially longer than the raising spring 65 primarily to accommodate workpieces of greatly differing height without other adjustment of the mechanism 10.

In the illustrated construction, the handle 15 is secured to a foot 75 rigidly fixed on the carrier 30 (see FIG. 2) and the thumb button 17 controls a pilot operated valve 76 which is mounted in the carrier 30 and connected by lines 77 and 78 to the handle 15. Air under pressure is supplied to the valve 76 through a line 79 (see FIG. 1). Pressing the button 17 operates a pilot valve connected to the main valve 76 through the lines 77, 78 so that the main valve 76 shifts to direct air from the supply line 79 to both the line 25 leading to the driver 12 and a line 80 connected to the upper end of the actuator 55. This powers the motor of the driver 12 so as to rotate the blade 26 and also extends the actuator 55 from its rest toward its work position. Releasing the button 17 returns the valve 76 to its former position whereby air is directed from the supply line 79 to the lower end of the actuator 55 through a line 81 and to a second line 82 whose purpose will be explained below. Air admitted to the lower end of the actuator 55 through the line 81 returns the actuator from its work to its rest position.

*Part feeding apparatus*

Pursuant to the invention, the part feeding apparatus 19 includes the bin or hopper 20, a slide conveyor 85 sloping down from the hopper 20 to the working head of the driver 12, and a transfer device or feeder 86 for carrying individual screw parts from the end of the conveyor 85 to the holder 40 of the driver.

The hopper 20 is open topped and has a bottom that slopes to an arcuate portion 87. The conveyor is formed of a pair of bars 88 held rigidly spaced on the carrier 30 so as to define an intermediate straight slot 89 (see FIGS. 2, 4, 18 and 19). The lower end of the slot 89 is resiliently closed by a pair of spring fingers 91 (see FIG. 19) so that the slot 89 can be filled with a line of screws S, with their heads up, being gravity fed downwardly with the lowest screw held at the end of the conveyor by the fingers 91. Outward pressure on the lowermost screw snaps the screw between the fingers 91 and the entire line of screws slides down one step. Preferably, a hold-down bar 92 is mounted on the conveyor 85 just above the slot 89. The bar 92 keeps the screw parts from jumping out of the slot. The straight line slide path defined by the conveyor bars 88 provides reliable gravity feed of variously configured parts.

Figure 2:
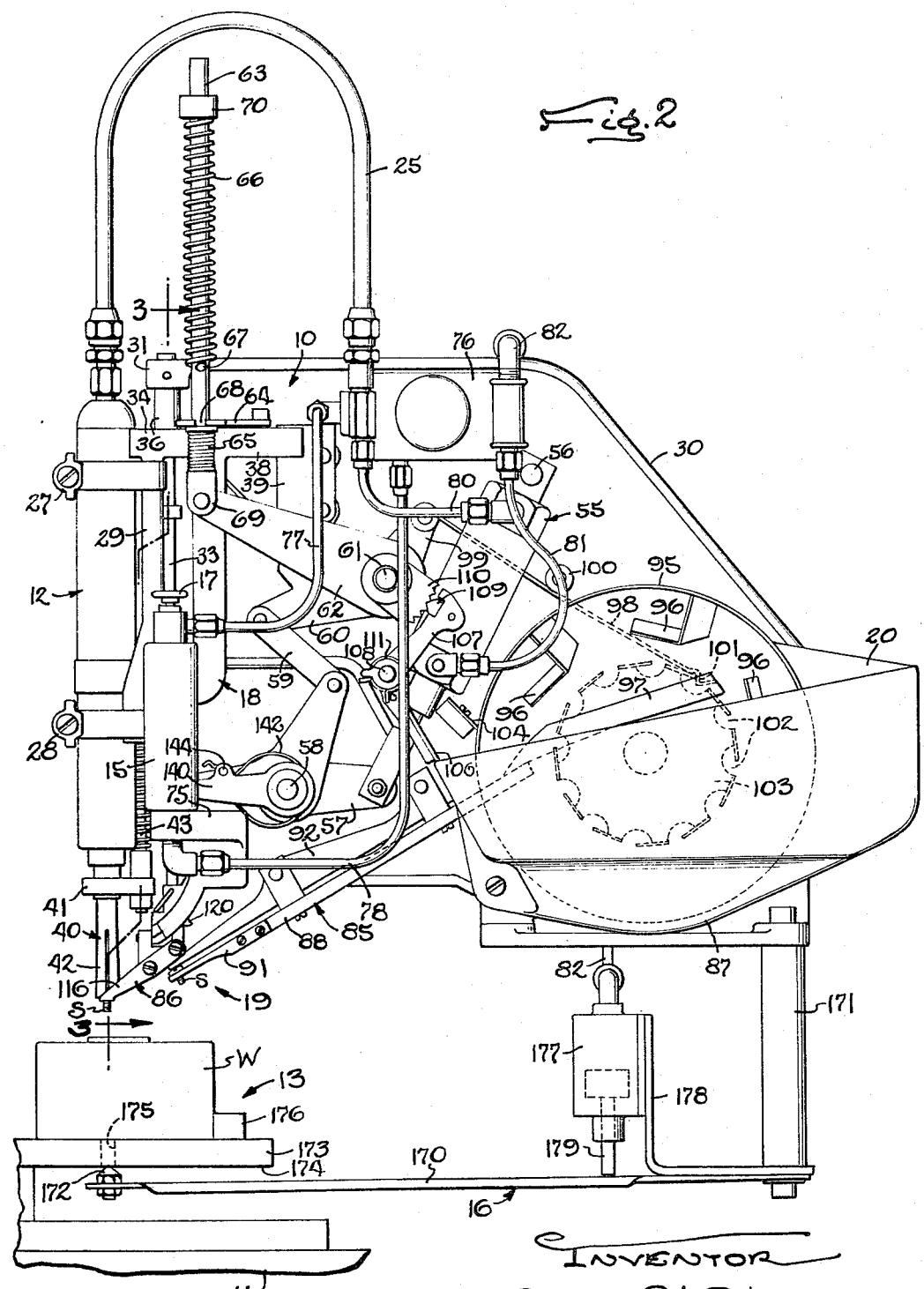
FIG. 2 is a transverse section, slightly enlarged, of the mechanism shown in FIG. 1.

For feeding screw parts from the hopper 20 into the conveyor 85, a wheel 95 is journalled in the hopper and provided with a plurality of scoops 96 (see FIG. 2) spaced around the wheel periphery. The lower end of the wheel 95 rotates within the arcuate bottom portion 87 of the hopper 20. As the wheel rotates counterclockwise, as seen in FIG. 2, each of the scoops 96 moves through the bottom of the hopper 20 and picks up a quantity of screw parts. The screws spill from the scoops 96 as the scoops reach the top of their travel path and fall onto a trough plate 97 that guides the screw parts toward the upper end of the slot 89. A certain proportion of the screw parts fall into the slot in proper alinement and the rest spill back into the hopper 20. A sufficient number are properly received that the conveyor is full virtually all of the time the mechanism 10 is operated.

To rotate the wheel 95, a ratchet pawl 98 is secured to an arm 99 on the bell crank 60. The pawl 98 is passed under a restraining lug 100 on the carrier 30 and is formed with a bent tip 101 that resiliently engages peripheral notches 102 formed on a disk 103 secured to the back of the wheel 95. A no-back element 104 is mounted on the carrier 30 so as to frictionally engage the periphery of the wheel 95 and prevent clockwise rotation of the wheel. It can thus be seen that each rocking cycle of the second bell crank 60 incident to extending and retracting the actuator 55 causes the ratchet wire 98 to advance the wheel 95 one step in a counterclockwise direction.

To insure against parts jamming the conveyor slot 89, a vibrating kicker 106 is provided just above the slot with a lower end shaped, together with the slot, to define the proper upright shape of the parts being handled (see particularly FIGS. 4 and 18). The kicker 106 is carried on a crank 107 that is pivoted on a shaft 108 secured to the carrier 30. The crank 107 includes an arm carrying a pawl 109 that is cooperable with a toothed member 110 mounted for rotation with the second bell crank 60. A torsion spring 111 urges the crank 107 counterclockwise and holds the pawl 109 in engagement with the teeth of the member 110. It can thus be seen that rocking movement of the bell crank 60, in either direction, during cycling of the actuator 55, causes the pawl 109 to snap over the teeth of the member 110 so as to vibrate the kicker 106 longitudinally of the slot 89 in a series of short, rapid strokes. This assures that only those screws properly alined in the slot 89 are allowed to move down the conveyor 35 and the misalined screws are kicked back into the hopper 20.

Figure 3:
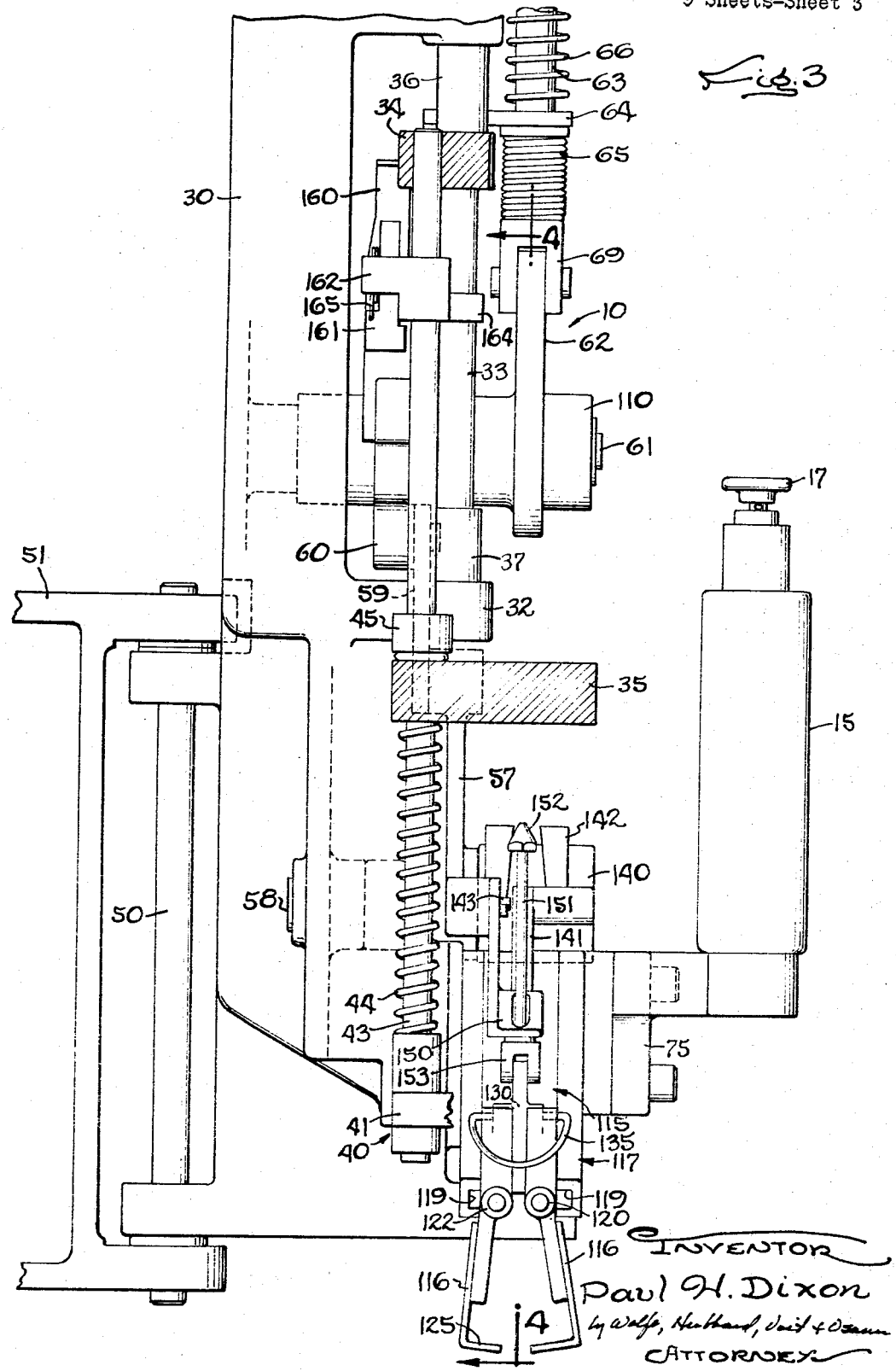
FIG. 3 is an enlarged section taken approximately along the line 3—3 in FIG. 2.

The feeder 86 includes a block 115 (see FIGS. 4 and 16) carrying a pair of gripping fingers 116 (see FIGS. 13 and 15) and being shiftably mounted in a slide bracket 117 (see FIG. 21). The bracket 117 is rigidly fixed on the carrier 30 (see FIGS. 2–4). The block 115 is formed with opposite arcuate ribs 118 which slidably fit in opposed grooves 119 formed in the bracket 117 so that the block 115 shifts along an arcuate path. The block 115 is also formed with integral tabs 120 which abut pins 121 anchored in the block 117 to define limit positions to the sliding movement of the block 115 (see particularly FIG. 4). The fingers 116 are pivoted on the block 115 by pins passing through lugs 122 on the fingers which fit on opposite sides of hubs 123 formed integrally with the block 115 (see also FIG. 4). The fingers 116 also have inturned tips 125 which are notched so as to embrace and grip individual screw parts (see FIGS. 5 and 7).

To open and close the fingers 116, an operator 130 is slidably fitted in a slot 131 in the block 115 so as to cooperate with cam tabs 132 formed integrally with the rearward set of lugs 122 on the fingers 116 (see particularly FIGS. 4 and 13–15). Urging the operator 130 downwardly in the slot 131 causes inwardly sloping cam surfaces 133 on the operator 130 to cam the tabs 132 toward one another, thus opening the fingers 116 (see FIG. 15). Lifting the operator 130 relative to the block 115 causes outwardly sloping cam surfaces 134 on the operator 130 to cam the tabs 132 apart, thus closing the fingers 116 (see FIG. 13). A spring clip 135 is spread and has its ends inserted through holes 136 in the block 115 so as to bear on opposite sides of the operator 130 and thus frictionally hold the operator in whichever position it is set in the slot 131.

In keeping with the invention, the feeder 86 is shifted and its fingers 116 opened and closed by the same operator controlling the bracket 29. To couple the bracket operating actuator 55 and the block 115, a lost motion linkage is provided including a crank arm 140 pivoted on the shaft 58 and connected to the block 116 by a link 141. A torsion spring 142 surrounds the shaft 58 with its outer arms resiliently pressed toward each other but arrested by a pin 143 on the bell crank 57 and a pin 144 on the arm 140. As the actuator 55 retracts toward its rest position, the bell crank 57 is turned counterclockwise so that the pin 143 pulls down on the lower arm of the spring 142 and this exerts a force through the spring against the pin 144 that urges the crank arm 140 downwardly. The crank arm 140 rotates until the block 115, moved through the link 141, is arrested by engagement between the upper tabs 120 and the slide bracket pins 121. Further counterclockwise rotation of the crank arm 57 results in taking up the lost motion embodied in the connecting linkage by opening the spring 142 (see particularly FIG. 4). As the actuator 55 is extended toward its work position, the bell crank 57 rotates clockwise so that the crank pin 143 lifts the upper end of the spring 142 and force is exerted through the spring against the crank arm pin 144 so as to turn the crank clockwise. This lifts the block 115 through the link 141 until the lower tabs 120 abut the pins 121. Further clockwise movement of the bell crank 57 results in taking up lost motion and spreading of the ends of the spring 142 (see particularly FIG. 14).

To couple the actuator 55 and the gripping finger operator 130, the bell crank 57 is formed with an apertured extension 150 which receives a rod 151 pivotally coupled to the operator 130. The rod 151 has upper and lower abutments 152 and 153, respectively, that are engaged by the apertured extension 150 to open and close the fingers 116 incident to final movement of the actuator 55 into its rest and work positions. Thus, the fingers 116 are at their workhead position with the upper tabs 120 abutting the pins 121 before final counterclockwise rotation of the bell crank 57 causes the extension 150 to push downwardly on the rod abutment 153 causing downward sliding movement of the operator 130 which is effective to open the fingers 116 (see FIG. 4). Conversely, the fingers 116 are at their conveyor position with the lowermost tabs 120 abutting the pins 121 before final clockwise movement of the bell crank 57 causes the extension 150 to lift on the rod abutment 152 so as to slide the operator 130 upwardly and close the fingers 116 (see particularly FIG. 14).

For causing the holder 40 to pick up screw parts from the fingers 116 when they carry one of the screws S to their workhead position, a one-way connection is provided between the actuator 55 and the holder rod 43. In the preferred construction, the one-way connection includes a spring blade 160 on the second bell crank 60 that engages an operator in the form of a snap lug 161 on the rod 43 (see FIGS. 4 and 17). The snap lug 161 is pivoted on a bracket 162 about a pin 163 and the bracket 162 is locked on the holder rod 43. Alinement of the bracket 162 is maintained by an arm 164 of the bracket being slidably fitted on the main mounting rod 33. The snap lug is biased by a torsion spring 165 so that the lug is held in a normal position with an end 166 abutting the upper surface of the bracket 162.

Upon counterclockwise rotation of the bell crank 60, incident to the stroke of the actuator 55 from rest to work position, the spring blade 160 swings idly by the snap lug 161 with the latter giving way against the light resistance of the spring 165, and thus the position of the holder rod 43 is not affected. Upon return movement of the actuator from its work position back to its rest position, the crank 60 rotates clockwise and the blade 160 picks up the lug 161 and lifts the rod 43 and the holder fingers 42 relative to the driver 12 (see FIG. 12). The holder 40 is thus held in inactive position as the bracket 29 is raised and the feeder fingers 116 swing to their workhead position. As the bracket 29 reaches its fully retracted, upraised position, further upward movement of the rod 43 is prevented and hence the blade 160 deflects and slips from beneath the lug 161. This drops the rod 43 under the force of gravity and the spring 44 so that the resilient fingers 42 jam down and around the head of the screw part S held positioned by the feeder fingers 116. As mentioned above, final movement of the actuator 55 and the associated linkages opens the feeder fingers 116 and this occurs after the holder 40 has been dropped to engage and frictionally grip the screw part.

*Finder-positioner device*

The finder-positioner device 16 includes a resilient arm 170 mounted on a pair of posts 171 depending from the mechanism carrier 30 (see FIGS. 1, 2, 22 and 23). Preferably, the arm 170 is formed as a flat, triangular blade having a conical tip 172 mounted at its outer end so as to be movable vertically upon flexing of the arm. The arm cooperates with the fixture 13 which, in the illustrated construction, has a cantilevered plate 173 that supports the workpiece W on its top and which defines a flat surface 174 on its bottom against which the arm tip 172 slides.

In carrying out this aspect of the invention, depressions in the form of circular holes 175 are formed in the fixture surface 174 corresponding positionally to the work points on the workpiece which, in the illustrated arrangement, constitutes threaded holes on the upper surface of the workpiece. Preferably, the arm tip 172 is positioned directly beneath the driver blade 26, and the holes 175 are formed directly beneath the threaded holes in the workpiece W when the latter is located within positioning blocks 176 on the fixture plate 173. A one-way pneumatic actuator 177 is mounted on a right angled plate 178 secured to the posts 171 so that a driver or piston rod 179 engages the arm 170 when fully extended. The pneumatic line 82 connects to the actuator 177 and, when air is supplied under pressure to the line 82, the actuator rod 179 extends against the arm 170 so as to hold the arm downwardly against its resilient bias in a position wherein the tip 172 just engages the fixture surface 174 (see FIG. 2). When the actuator 177 is deactivated, the arm 170 is freed to flex upwardly so that the tip 172 bears strongly against the surface 174 (see FIG. 22).

In operation, it will be seen that the line 82 is supplied with air at the same time as the line 81 so that the actuator 55 is held in its rest position and the actuator 177 is held actuated when the control valve 76 is in its normal position. The user of the mechanism 10 can then shift the carrier 30 about over the workpiece W, and the finder arm tip 172 will ride lightly on the fixture surface 174, snapping with a slight detenting action into the holes 175 as they are encountered. This gives the user a clicking kind of sensation that indicates the driver is then over a threaded hole with the screw S poised for insertion. Upon pressing the button 17, the actuator 177 is deactivated and the finder arm relaxes upwardly so that, as the actuator 55 begins movement toward its work position, the full resilient force of the arm 170 bears upwardly causing the conical tip 172 to center firmly into the hole 175 which it engages. This exerts a camming action that positively centers the driver 12 in alinement with the overlying threaded hole in the workpiece and which holds the driver properly positioned during the screw inserting operation. Upon release of the pilot valve thumb button 17 upon insertion of the screw, the actuator 177 is immediately reactivated at the same time as the actuator 55 is started on its work position to rest position stroke. Activation of the actuator 177 again causes the arm 170 to be held down and the carrier 30 is therefore freed for being conveniently positioned over the next threaded hole which is to receive a screw S.

*Summary of operation*

While the operation of all elements and subassemblies of the mechanism 10 has been discussed in detail above, it will be helpful to briefly describe a cycle of operation with reference to diagrammatic FIGS. 6, 8, 9, 10 and 12 together with detailed FIGS. 7, 11 and 14. In this descriptive summary, the relative positions of the parts will be briefly referred to so as to better picture the timing and interaction of the subassemblies.

The starting or inactive position of the mechanism 10 is shown in FIG. 6. The actuator 55 is fully contracted into its rest position. The bell crank 57 is rotated to its fully counterclockwise position so that the extension 150 bears on the abutment 153, forcing the operator 130 downwardly and holding the feeder fingers 116 open. The crank arm 140 is also in its fully counterclockwise position holding the feeder 86 in its downward, workhead position. The second bell crank 60 is held, through the link 59, in its fully clockwise position so that the actuating rod 63 is lifted and the lifting spring 65 compressed against the bracket plate 64, thus holding the driver bracket 29 up against the spacer 36 on the mounting rod 33. The rod 43 is free so that the holder 40 is in its active position with the stop collar 45 abutting the lug 35. A screw part S is held poised beneath the driver blade 26 by the resilient holder fingers 42.

The mechanism 10 is thus ready for positioning by the operator grasping the handle 15 so as to swing the driver over the threaded hole in the workpiece W into which the screw S is to be inserted. In the preferred construction, the finder-positioner device 16 assists in properly locating the driver, in the manner described just above.

Upon pressing the thumb button 17 so that the pilot valve shifts the main valve 76, the parts assume their FIG. 8 positions. The actuator 55 begins its extending stroke toward its work position, rotating the crank 57 clockwise so that the crank arm 140, through the link 141, lifts the block 115 through its sliding path of movement so as to bring the fingers 116 back and up from their workhead position. The bell crank 60 begins to rotate counterclockwise but the raising spring 65 initially maintains the driver bracket 29 up against the spacer 36. As a result, the feeder 86 is swung clear of the working head region of the driver 12 before the driver begins its downward movement.

At the completion of the rest position to work position stroke of the actuator 55 the parts assume the positions shown in FIG. 9. The actuator 55 is fully extended and the bell crank 57 rotated fully clockwise. This has pulled the second bell crank 60 into its extreme counterclockwise position so that the rod 63 has been pulled downwardly sufficiently far to slide the rod pin 67 through the slot 68 in the bracket plate 64 with the result that the effect of the raising spring 65 is eliminated and the driver bracekt 29 moved downwardly under the force of gravity and the urging of the lowering spring 66. When the screw S encounters the opening of the threaded hole into which it is to be inserted, further downward movement of the holder 40 is arrested and the driver 12 continues its downward movement carried by the bracket 29. The rod 43 thus moves upwardly, lifting the stop collar 45 from the bracket lug 35 and slightly compressing the spring 44. As soon as the main valve 76 was shifted to extend the actuator 55, air under pressure was also supplied to the driver 12 so that the driver tip 26 is rotatably driven as it moves downwardly. Thus, downward relative movement of the driver blade 26 relative to the arrested screw S quickly brings the blade into engagement with the slot headed screw and the latter is rotatably driven into its threaded hole. Upon completion of this quickly performed function, the parts assume the position shown in FIG. 11. It will be appreciated that the driver 12 continues its downward movement to follow up the threadably advanced screw S even through the actuator 55 had reached its fully extended position since the lowering spring 66 maintains downward pressure on the bracket plate 64 during the threadable insertion of the screw part.

While the above described parts reach their FIGS. 9 and 11 positions, the feeder 86 and its actuating mechanism assume the positions shown in FIG. 14. Clockwise movement of the bell crank 57 pulls the crank arm 140 clockwise until the lowermost lugs 120 abut the pins 121, at which point the fingers 116 are positioned, open, on either side of the lowermost screw part S which is restrained within the conveyor bars 88 by the resilient fingers 91. Final clockwise movement of the bell crank 57 incident to the actuator 55 reaching its fully extended work position causes the bell crank extension 150 to lift the rod 151 by engaging the abutment 152 so that the operator 130 is shifted upwardly, closing the fingers 116 about the lowermost screw part. The frictional force exerted by the spring clamp 135 holds the fingers 116 firmly on either side of the screw part.

After the screw part S has been threaded into the workpiece W, the operator releases the thumb button 17 so as to restore the main valve 76 and initiate return movement of the actuator 55 to its rest position, and the parts thus assume the positions shown in FIG. 10. The initial contracting movement of the actuator 55 rotates the bell crank 57 counterclockwise and the second bell crank 60 clockwise but the lost motion embodied in the linkage simply causes the actuating rod 63 to be lifted freely relative to the bracket 29 until the rod pin 67 passes through the slot 68 in the bracket plate 64. At this point, the lifting spring 65 abuts the bottom of the plate 64 and an upward force is exerted on the driver bracket 29. At about the same time, the spring blade 160 engages the snap lug 161 on the holder rod 43 and, thereafter, further return movement of the actuator 55 results in lifting both the driver bracket 29 and the holder 40 without relative movement between the two and with the holder in its raised, inactive position. It will be appreciated that the resilient holder fingers 42 snap easily from about the head of the threadably inserted screw part S.

As the parts reach their FIG. 12 position, contraction of the actuator 55 has swung the bell crank 57 sufficiently far counterclockwise so that the arm 140, through the link 141, has returned the feeder fingers 116, now clamped about a screw part S, down to their workhead position. Abutment between the upper lugs 120 and the pins 121 arrests further movement of the crank arm 140, but lost motion between this crank arm and the bell crank 57 is taken up by spreading the ends of the spring 142. At about this time, the driver bracket 29 engages the upper spacer stop 36 so that its upward movement is halted and continued clockwise rotation of the bell crank 60 raises the rod 63 so as to compress the raising spring 65. With movement of the bracket 29 halted, the holder 40 is unable to continue its upward movement and further clockwise rotation of the second bell crank 60 causes the blade 160 to deflect and slip beyond the snap lug 161. As soon as the snap lug 161 is cleared by the blade 160, the holder 40 drops downwardly under the force of gravity and its spring 44 so that the resilient holder fingers 42 jam about the head of the screw part S being held by the feeder fingers 116, the position of the parts shown in FIG. 7.

Final contracting movement of the actuator 55 into its rest position causes the extension 150 of the bell crank 57 to engage the operator rod abutment 153 so as to shift the operator 130 downwardly, opening the fingers 116, and the parts are thus returned to their starting FIG. 6 positions.

Those skilled in the art will appreciate most of the features and advantage embodied in the structure whose arrangement and operation have been discussed above. However, a few additional points are worthy of mentioning.

It can be seen that alternate conventional tools can be readily substittued for the drive 12 by simply releasing the clamps 27, 28 and mounting the desired tool in the cradle defined by the bracket 29. The mechanism which actuates the carrier 29 adapts to workpieces of varying heights without modification since the stroke of the actuator 55 and the length of the lowering spring 66 are such to exert a downward force on the bracket 29 through a considerable vertical range. The latter may be varied by substituting spacers 36 and 37 of different lengths.

Since a single actuator 55 is utilized to perform multiple functions, it will be seen that a particularly compact, easily operated mechanism has been provided. The pneumatic controls for the mechanism 10 are simple and straightforward and positive timing and interaction between the various subassemblies is assured because of the common driving actuator.

The part feeding apparatus 19 is compact, reliable and particularly well suited for high-speed operation since new parts are being picked up for the next operation while the formerly handled part is being driven into place. In other words, the feeding and driving functions are carried on substantially simultaneously so as to greatly reduce the overall cycling time of the mechanism 10. The straight-through feeding conveyor of the part feeding apparatus also makes the apparatus well suited for handling parts of odd configurations and avoids potential jam ups.

I claim as my invention:

1. An assembling mechanism comprising, in combination, a frame, means for positioning a workpiece, a carrier mounted on said frame for movement in a plane spaced from said means, a bracket for carrying a tool with a working head, said bracket being slidably mounted on said carrier for reciprocating movement toward and away from said means between a retracted position and a working position, a part retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts between the end of said conveyor and the working head in its retracted position, means interconnecting said bracket and said feeder so that the feeder picks up a part from said conveyor when the bracket is in working position and delivers the part to the working head when the bracket is in retracted position, and a finder arm mounted on said carrier and coacting with said workpiece positioning means for locating the carrier at a selected position relative to the workpiece whereby the sliding movement of said bracket will bring the tool working head to a given point on the workpiece.

2. An assembling mechanism comprising, in combination, a frame, means for positioning a workpiece, a carrier mounted on said frame for movement in a plane spaced from said means, a bracket for carrying a tool with a working head, said bracket being slidably mounted on said carrier for reciprocating movement toward and away from said means between a retracted position and a working position, said working head being spaced from the workpiece when the bracket is in said retracted position, a part retaining hopper on said carrier, a conveyor on said carrier extending from said hopper to a point adjacent the retracted position of said working head, a rotatable scooper on said carrier for feeding parts from said hopper into said conveyor, a feeder shiftably mounted on said carrier for carrying parts from the end of said conveyor and for delivering the parts to the working head in its retracted position, and means interconnecting said bracket and said feeder so that the feeder picks up a part from said conveyor when the bracket is in working position and delivers the part to the working head when the bracket is in retracted position, said means including a ratcheting drive for rotating said scooper incident to movement of said bracket.

3. An assembling mechanism comprising, in combination, a frame, a fixture for positioning a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a finder arm mounted on said carrier, means on said fixture cooperable with said arm for locating said carrier at a selected position wherein sliding movement of said bracket will bring the tool working head to a given point on the workpiece, a part retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts between the end of said conveyor and the working head in its retracted position, and means interconnecting said bracket and said feeder so that the feeder picks up a part from said conveyor when the bracket is in working position and delivers the part to the working head when the bracket is in retracted position.

4. An assembling mechanism comprising, in combination, a rigid, vertically extending frame post, a fixture for positioning a workpiece, an arm of substantial height pivoted at upper and lower points on said post for horizontal swinging movement, a carrier defined by an open-sided box-like housing pivoted at upper and lower points on the end of said arm for movement in a plane spaced above said fixture, a bracket for carrying a tool with a working head, said bracket being slidably mounted within said carrier housing for reciprocating movement toward and away from said fixture between a retracted position and a working position, said working head being spaced from the workpiece when said bracket is in said retracted position, means including a feeder shiftably mounted on said carrier for carrying parts to the working head in its retracted position, means within said carrier housing interconnecting said bracket and said feeder so that the feeder delivers a part to the working head when the bracket is in retracted position, and a holder associated with said carrier for gripping a part delivered to said working head when the bracket is in said retracted position and for releasing the part when the bracket moves from said working position toward said retracted position.

5. An assembling mechanism as defined in claim 4 further including a parts retaining hopper on said carrier, a conveyor on said carrier extending from said hopper to a point adjacent the retracted position of said working head, and means within said carrier housing for feeding parts from said hopper into said conveyor.

6. In a tool locating assembly, the combination of, a frame, a fixture for positioning a workpiece, said fixture having a flat surface formed with a pattern of depressions each corresponding positionally to a work point on the workpiece, a carrier mounted on said frame for movement in a plane spaced from said fixture, a bracket for carrying a tool with a working head, said bracket being slidably mounted on said frame for the reciprocating movement toward and away from said fixture between a retracted position and a working position, a resilient finder arm mounted cantilever fashion on said carrier for vertical movement relative to the carrier between first and second positions, said arm having a tip adapted to slide on said fixture surface and detent into alternate one of said depressions when the arm is in said first position, said tip entering into one of said depressions when said arm is in said second position thereby to cam said carrier into proper alinement with the workpiece so that sliding movement of said bracket will bring the tool to the work point corresponding to the depression entered into by said tip, and means holding said arm in said first position when said bracket is in said retracted position and releasing said arm as said bracket approaches said working position whereby the arm moves to the second position by virtue of its resiliency.

7. An assembling mechanism comprising, in combination, a rigid, vertically extending frame post, a fixture for positioning a workpiece, an arm of substantial height pivoted at upper and lower points on said post for horizontal swinging movement, a carrier defined by an open-sided box-like housing pivoted at upper and lower points on the end of said arm for movement in a plane spaced above said fixture, a bracket for carrying a tool with a working head, said bracket being slidably mounted within said carrier housing for reciprocating movement toward and away from said fixture between a retracted position and a working position, a finder arm mounted on said carrier, means on said fixture cooperable with said arm for locating said carrier at a selected position wherein sliding movement of said bracket will bring the tool working head to a given point on the workpiece, a parts retaining hopper on said carrier, a conveyor on said carrier extending between said hopper and adjacent the retracted position of said working head, means within said carrier housing for feeding parts from said hopper into said conveyor, a feeder shiftably mounted on said carrier for carrying parts between the end of said conveyor and the working head in its retracted position, and means within said carrier housing interconnecting said bracket and said feeder so that the feeder picks up a part from said conveyor when the bracket is in working position and delivers the part to the working head when the bracket is in retracted position.

8. An assembling mechanism comprising, in combination, a frame, a carrier mounted on said frame, a bracket slidably mounted on said carrier for reciprocating movement between a retracted position and a working position, a tool mounted on said bracket and having a working head, a resilient tubular holder slidably mounted on and telescoped over said tool for frictionally gripping a part adjacent said working head when in active position, a feeder shiftably mounted on said carrier for carrying parts to the working head in its retracted position, and means interconnecting said bracket and said feeder so that the feeder delivers a part to the working head when the bracket is in retracted position, said means having a one-way connection with said holder for holding the latter from active position until the bracket is in retracted position and the feeder has delivered a part to the working head.

9. An assembling mechanism comprising, in combination, a carrier, a bracket slidably mounted on said carrier for reciprocating movement between a retracted position and a working position, a tool mounted on said bracket and having a working head, a resilient tubular holder slidably mounted on and telescoped over said tool for frictionally gripping a part adjacent said working head when in active position, an operator connected to said holder for moving the latter axially relative to said tool, a part retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts between the end of said conveyor and the working head in its retracted position, and means interconnecting said bracket and said feeder so that the feeder picks up a part from said conveyor when the bracket is in working position and delivers the part to the working head when the bracket is in retracted position, said means having a one-way connection with said operator for holding the holder from active position until the bracket is in retracted position and the feeder has delivered a part to the working head, said connection including a resilient member operable to engage said operator as said bracket moves toward said retracted position.

10. An assembling mechanism comprising, in combination, a frame, a fixture for positioning a workpiece, a carrier mounted on said frame for movement in a plane spaced from said fixture, a bracket slidably mounted on said carrier for reciprocating movement toward and away from said fixture between a retracted position and a working position, a tool mounted on said bracket and having a working head facing said fixture, a holder slidably mounted on said tool for frictionally gripping a part adjacent said working head when in active position, an operator connected to said holder for moving the latter axially relative to said tool, a part retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts from the end of said conveyor to the working head in its retracted position, and means interconnecting said bracket and said feeder so that the feeder picks up a part from said conveyor when the bracket is in working position and delivers the part to the working head when the bracket is in retracted position, said means having a one-way connection with said holder for holding the latter from active position until the bracket is in retracted position and the feeder has delivered a part to the working head, said connection including a resilient member operable to engage said operator as said bracket moves toward said retracted position.

11. An assembling mechanism comprising, in combination, a frame, a fixture for positioning a workpiece, a carrier mounted on said frame for movement in a plane spaced from said fixture, a bracket slidably mounted on said carrier for reciprocating movement toward and away from said fixture between a retracted position and a working position, a tool mounted on said bracket and having a working head facing said fixture, a holder slidably mounted on said tool for frictionally gripping a part adjacent said working head when in active position, a finder arm mounted on said carrier means on said fixture cooperable with said arm for locating said carrier at a selected position wherein sliding movement of said bracket will bring the tool working head to a given point on the workpiece, a parts retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts between the end of said conveyor and the working head in its retracted position, and means connecting and operating said bracket, said holder and said feeder so that the feeder picks up a part from said conveyor when the bracket is in working position, the holder is moved from active position as the bracket returns to retracted position, the feeder delivers the part to the working head when the bracket reaches retracted position, and the holder slides to active position when the feeder makes that delivery.

12. In an assembling mechanism, a part feeder apparatus comprising, in combination, a tool with a working head, a parts retaining hopper, a conveyor extending between said hopper and said working head, means for feeding parts from said hopper into said conveyor, a feeder block shiftably mounted relative to said tool, gripping fingers mounted for opening and closing movement on said block for carrying parts between the conveyor and the working head, an operating element on said block for closing and opening said fingers when shifted in opposite directions, an operator for movement between work and rest positions, a first linkage including lost motion mechanism interconnecting said operator and said feeder block so that with the operator in rest position the feeder fingers are at the working head with lost motion taken up and with the operator in work position the feeder fingers are at said conveyor with lost motion taken up, and a second linkage interconnecting said operator and said operating element for closing said fingers when the operator is in work position and opening the fingers when the operator is in rest position.

13. In an assembling mechanism, the combination comprising, a tool with a working head mounted for reciprocating movement between a retracted position and a working position, a feeder block shiftably mounted relative to said tool, gripping fingers mounted for opening and closing movement on said block for carrying parts to the working head in its retracted position, an operating element on said block for closing and opening said fingers when shifted in opposite directions, an operator mounted for movement between work and rest position, a first linkage including lost motion mechanism interconnecting said operator and said tool so that with the operator in rest position the tool is in retracted position with lost motion taken up and with the operator in work position the tool is in working position with lost motion taken up, a second linkage including lost motion mechanism interconnecting said operator and said feeder block so that with the operator in rest position the feeder fingers are at the working head with lost motion taken up and with the operator in work position the feeder fingers are at said conveyor with lost motion taken up, and a third linkage interconnecting said operator and said operating element for closing said fingers when the operator is in work position and opening the fingers when the operator is in rest position.

14. An assembling mechanism comprising, in combination, a frame, a fixture for positioning a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a parts retaining hopper on said carrier, a conveyor on said carrier extending between said hopper and adjacent the retracted position of said working head, means on said carrier for feeding parts from said hopper into said conveyor, a feeder block shiftably mounted on said carrier, gripping fingers mounted for opening and closing movement on said block for carrying parts between the end of said conveyor and the working head in its retracted position, an operating element on said block for closing and opening said fingers when shifted in opposite directions, an operator mounted on said carrier for movement between work and rest positions, a first linkage including lost motion mechanism interconnecting said operator and said bracket so that with the operator in rest position the bracket is in retracted position with lost motion taken up and with the operator in work position the bracket is in working position with lost motion taken up, a second linkage including lost motion mechanism interconnecting said operator and said feeder block so that with the operator in rest position the feeder fingers are at the working head with lost motion taken up and with the operator in work position the feeder fingers are at said conveyor with lost motion taken up, and a third linkage interconnecting said operator and said operating element for closing said fingers when the operator is in work position and opening the fingers when the operator is in rest position.

15. An assembling mechanism comprising, in combination, a frame, a fixture for positioning a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a finder arm mounted on said carrier, means on said fixture cooperable with said arm for locating said carrier at a selected position wherein sliding movement of said bracket will bring the tool working head to a given point on the workpiece, a parts retaining hopper on said carrier, a conveyor on said carrier extending between said hopper and adjacent the retracted position of said working head, means on said carrier for feeding parts from said hopper into said conveyor, a feeder block shiftably mounted on said carrier, gripping fingers mounted for opening and closing movement on said block for carrying parts between the end of said conveyor and the working head in its retracted position, an operating element on said block for closing and opening said fingers when shifted in opposite directions, an operator mounted on said carrier for movement between work and rest positions, a first linkage including lost motion mechanism interconnecting said operator and said bracket so that with the operator in rest position the bracket is in retracted position with lost motion taken up and with the operator in work position the bracket is in working position with lost motion taken up, a second linkage including lost motion mechanism interconnecting said operator and said feeder block so that with the operator in rest position the feeder fingers are at the working head with lost motion taken up and with the operator in work position the feeder fingers are at said conveyor with lost motion taken up, and a third linkage interconnecting said operator and said operating element for closing said fingers when the operator is in work position and opening the fingers when the operator is in rest position.

16. In an assembling mechanism, the combination comprising, a carrier for carrying a tool with a working head, a parts retaining hopper on said carrier, a convyeor on said carrier extending between said hopper and adjacent said working head, means on said carrier for feeding parts from said hopper into said conveyor, said conveyor defining a slot inclined downwardly in a straight line from said hopper to the working head position, means on said conveyor resiliently closing the lower end of said slot, a kicker mounted for movement on said carrier above said conveyor slot, said kicker having a lower end shaped, together with said slot, to define the upright shape of parts being handled by said mechanism, a feeder shiftably mounted on said carrier for carrying parts between the end of said conveyor and the working head, and means for vibrating said kicker so as to kick parts not properly alined from the conveyor back into the hopper.

17. An assembling mechanism comprising, in combination, a carrier, a bracket for carrying a tool with a working head, said bracket being slidably mounted on said carrier for reciprocating movement between a retracted position and a working position, a parts retaining hopper on said carrier, a conveyor on said carrier extending between said hopper and adjacent the retracted position of said working head, means on said carrier for feeding parts from said hopper into said conveyor, said conveyor defining a slot inclined downwardly in a straight line from said hopper to the working head position, means on said conveyor resiliently closing the lower end of said slot, a kicker mounted for movement on said carrier above said conveyor slot, said kicker having a lower end shaped, together with said slot, to define the upright shape of parts being handled by said mechanism, a feeder shiftably mounted on said carrier for carrying parts from the end of said conveyor to the working head when the latter is in its retracted position, and means interconnecting said bracket and said feeder so that the feeder picks up a part from said conveyor when the bracket is in working position and delivers the part to the working head when the bracket is in retracted position, said means including a device for vibrating said kicker in response to movement of said bracket so as to kick parts not properly alined from the conveyor back into the hopper.

18. An assembling mechanism comprising, in combination, a frame, a fixture for positioning a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a finder arm mounted on said carrier, means on said fixture cooperable with said arm for locating said carrier at a selective position wherein sliding movement of said bracket will bring the tool working head to a given point on the workpiece, a parts retaining hopper on said carrier, a conveyor on said carrier extending between said hopper and adjacent the retracted position on said working head, means on said carrier for feeding parts from said hopper into said conveyor, said conveyor defining a slot inclined downwardly in a straight line from said hopper to the working head position, means on said conveyor resiliently closing the lower end of said slot, a kicker mounted on said carrier above said conveyor slot, said kicker having a lower end shaped, together with said slot, to define the upright shape of parts being handled by said mechanism, a feeder shiftably mounted on said carrier for carrying parts between the end of said conveyor and the working head in its retracted position, and means interconnecting said bracket and said feeder so that the feeder picks up a part from said conveyor when the bracket is in working position and delivers the part to the working head when the bracket is in retracted position, said means including a device for vibrating said kicker incident to movement of said bracket so as to kick parts not properly alined from the conveyor back into the hopper.

19. An assembling mechanism comprising, in combination, a frame, a fixture for positioning a workpiece, said fixture a flat surface formed with a pattern of depressions each corresponding positionally to a work point on a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a resilient finder arm mounted on said carrier, said arm having a tip adapted to slide on said fixture surface and detent into alternate ones of said depressions so that sliding movement of said bracket will bring the tool to the work point corresponding to the depression engaged by said tip, a parts retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts between the end of said conveyor and a working head in its retracted position, and means interconnecting said bracket and said feeder so that the feeder picks up a part from said conveyor when the bracket is in working position and delivers the part to the working head when the bracket is in retracted position.

20. A tool locating assembly comprising, in combination, a frame, a fixture for positioning a workpiece, said fixture having a flat surface formed with a pattern of circular holes each corresponding positionally to a work point on a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a resilient finder arm mounted on said carrier, said arm having a conical tip adapted to slide on said fixture surface and detent into alternate ones of said holes so that sliding movement of said bracket will bring the tool to the work point corresponding to the hole engaged by said tip, an actuator on said carrier for releasably holding said arm so that said tip lightly engages said fixture surface, and means causing said actuator to release said arm as said bracket approaches said working position so that said conical tip centers in the circular hole it engages thereby camming said carrier into proper alinement with the workpiece.

21. An assembling mechanism comprising, in combination, a frame, a fixture for positioning a workpiece, said fixture having a flat surface formed with a pattern of circular holes each corresponding positionally to a work point on a workpiece, a carrier mounted on said frame for movement in a plane spaced from said fixture, a bracket for carrying a tool with a working head, said bracket being slidably mounted on said carrier for reciprocating movement toward and away from said fixture between a retracted position and a working position, a resilient finder arm mounted on said carrier, said arm having a conical tip adapted to slide on said fixture surface and detent into alternate ones of said holes so that sliding movement of said bracket will bring the tool to the work point corresponding to the hole engaged by said tip, an actuator on said carrier for releasably holding said arm so that said tip lightly engages said fixture surface, a parts retaining hopper on said carrier, a conveyor on said carrier extending between said hopper and adjacent the retracted position of said working head, means on said carrier for feeding parts from said hopper into said conveyor, a feeder shiftably mounted on said carrier for carrying parts between the end of said conveyor and the working head in its retracted position, means interconnecting said bracket and said feeder so that the feeder picks up a part from said conveyor when the bracket is in working position and delivers the part to the working head when the bracket is in retracted position, and means causing said actuator to release said arm before said bracket reaches said working position so that said conical tip centers in the circular hole it engages thereby camming said carrier into proper alinement with the workpiece.

References Cited by the Examiner
UNITED STATES PATENTS

| | | | |
|---|---|---|---|
| 480,530 | 8/1892 | Tobey | 29—211 X |
| 712,866 | 11/1902 | Tobey. | |
| 1,330,854 | 2/1920 | Elliott. | |
| 2,701,417 | 2/1955 | Graham | 77—27 X |
| 2,730,173 | 1/1956 | Brescka | 83—565 |
| 2,740,438 | 4/1956 | Austin | 144—32 |
| 3,011,534 | 12/1961 | Vilmerding | 144—32 |
| 3,192,615 | 7/1965 | Halverson | 29—211 |

ANDREW R. JUHASZ, *Primary Examiner.*